3,580,831
PHOTOCHLORINATION OF MONO- AND DI-CHLOROETHANE
Michael J. Mintz, Midland, Mich., assignor to The Dow Chemical Company, Midland, Mich.
No Drawing. Filed Jan. 13, 1969, Ser. No. 790,848
Int. Cl. B01j *1/10;* C07c *17/00*
U.S. Cl. 204—163                                   4 Claims

ABSTRACT OF THE DISCLOSURE

In the process for preparing compounds of the formula $CH_3CCl_2X$, wherein X is H or Cl, said process comprising reacting by contacting in the liquid phase, at a temperature of 0 to 50° C. in the presence of actinic light, a compound of the formula $CH_3CHClX$, wherein X is H or Cl, with $Cl_2$, the improvement of carrying out said reaction in the presence of a catalytic amount of $I_2$.

SUMMARY OF THE INVENTION

The present invention is an improvement in the process for preparing compounds of the formula $CH_3CCl_2X$, wherein X is H or Cl, said process comprising reacting by contacting in the liquid phase, at a temperature of 0 to 50° C. in the presence of actinic light, a compound of the formula $CH_3CHClX$, wherein X is H or Cl, with $Cl_2$, the improvement being carrying out said process in the presence of a catalytic amount of $I_2$. The improvement provides a higher selectivity, i.e., higher ratio of compounds of the formula $CH_3CCl_2X$ to compounds of the formula $CHClXCH_2Cl$ (wherein X is H or Cl), in the liquid phase photochlorination of mono- or di-chloroethane than can be obtained by carrying out this reaction in the absence of $I_2$.

Catalytic amounts of $I_2$ are sufficient for the purposes of this invention; for instance, about 1 to $1000 \times 10^{-5}$ moles of $I_2$ per mole of $CH_3CHClX$.

A temperature of 0 to about 50° C. is suitable, while a temperature of about 20 to 25° C. is preferred for convenience.

To favor the formation of $CH_3CCl_3$, conversions should be kept fairly low. As conversion rises, further chlorination of 1,1,2-trichloroethane is favored.

A diluent for $Cl_2$ can be used, but is not necessary, $N_2$ and inert gases, such as argon, krypton and neon, are suitable.

SPECIFIC EMBODIMENTS

The reactions were run in a 250 cc. 4-necked flask equipped with a stirrer, water cooled condenser, and two gas inlets extending to the bottom of the flask. The flask was immersed in a 25° C. water bath and irradiated from a distance of about 3 inches by a sunlamp. Chlorine and nitrogen were both conducted into the flask through rotameters. The flask was initially charged with a weighed amount of $I_2$ and 100 cc. of freshly distilled 1,1-dichloroethane for each run.

The reaction products were analyzed using V.P.C. Results are contained in Tables I through III below:

TABLE I

Data for Table I $Cl_2 = 0.12$ moles/hour
$N_2$-rate $= 0$ moles/hour
Reaction time $= 20$ minutes

| M. $I_2$/M. $CH_3CHCl_2$ | Molar ratio $CH_3CCl_3$/ $CH_2ClCHCl_2$ | Percent conversion of $CH_3CHCl_2$ |
|---|---|---|
| 0 | 3.17 | 3.9 |
| $4.16 \times 10^{-5}$ | 8.83 | 3.2 |
| $16.70 \times 10^{-5}$ | 8.76 | 2.4 |
| $34.20 \times 10^{-5}$ | 12.33 | 1.9 |
| $194.10 \times 10^{-5}$ | 27.10 | 1.3 |

TABLE II

Data for Table II $Cl_2 = 0.12$ moles/hour
$N_2 = 0.15$ moles/hour
Reaction time $= 20$ minutes

| M. $I_2$/M. $CH_3CHCl_2$ | Molar ratio $CH_3CCl_3$/ $CH_2ClCHCl_2$ | Percent conversion of $CH_3CHCl_2$ |
|---|---|---|
| 0 | 4.40 | 4.0 |
| $7.71 \times 10^{-5}$ | 6.48 | 2.7 |
| $10.30 \times 10^{-5}$ | 7.55 | 3.2 |
| $13.90 \times 10^{-5}$ | 8.93 | 2.7 |
| $18.50 \times 10^{-5}$ | 9.42 | 2.2 |
| $23.80 \times 10^{-5}$ | 11.69 | 1.8 |
| $28.60 \times 10^{-5}$ | 14.27 | 2.3 |
| $34.20 \times 10^{-5}$ | 15.37 | 1.7 |

TABLE III

Data for Table III $Cl_2 = 0.06$ moles/hour
$N_2 = 0.15$ moles/hour
Reaction time $= 60$ Minutes

| M. $I_2$/M. $CH_3CHCl_2$ | Molar ratio $CH_3CCl_3$/ $CH_2ClCHCl_2$ | Percent conversion of $CH_3CHCl_2$ |
|---|---|---|
| 0 | 3.60 | 3.9 |
| $6.5 \times 10^{-5}$ | 4.01 | 4.0 |
| $13.2 \times 10^{-5}$ | 4.59 | 4.0 |
| $21.6 \times 10^{-5}$ | 9.15 | 3.4 |

I claim:

1. In the process for preparing compounds of the formula $CH_3CCl_2X$, wherein X is H or Cl, by reacting by contacting in the liquid phase, at a temperature of 0 to 50° C. in the presence of actinic light, a compound of the formula $CH_3CHClX$, wherein X is as defined above, with $Cl_2$, the improvement of carrying out said process in the presence of a catalytic amount of $I_2$.

2. The process of claim 1 wherein the mole ratio of $I_2/CH_3CHClX$ is 1 to $1000 \times 10^{-5}$.

3. The process of claim 1 wherein the temperature is from 20 to 25° C.

4. The process of claim 1 wherein X is Cl.

References Cited

UNITED STATES PATENTS 3,019,175   1/1962   Haefner et al. _____ 204—163

BENJAMIN R. PADGETT, Primary Examiner

H. E. BEHREND, Assistant Examiner